United States Patent
Pathak

(10) Patent No.: US 8,001,404 B2
(45) Date of Patent: Aug. 16, 2011

(54) REMOTE WAKEUP WEB SERVICE FOR IMAGING DEVICE

(75) Inventor: Rabindra Pathak, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 800 days.

(21) Appl. No.: 12/074,531

(22) Filed: Mar. 4, 2008

(65) Prior Publication Data
US 2009/0228695 A1 Sep. 10, 2009

(51) Int. Cl.
G06F 1/26 (2006.01)
G06F 1/00 (2006.01)
G06F 15/177 (2006.01)
G06F 15/173 (2006.01)
G06F 13/42 (2006.01)
H04L 12/28 (2006.01)

(52) U.S. Cl. ........ 713/320; 713/300; 709/220; 709/223; 710/105; 370/254

(58) Field of Classification Search .............. 713/300, 713/320; 709/220, 223; 710/105; 370/254, 370/901, 908
See application file for complete search history.

(56) References Cited

U.S. PATENT DOCUMENTS

| | | | |
|---|---|---|---|
| 5,528,346 A | 6/1996 | Kim et al. | 399/33 |
| 5,812,085 A | 9/1998 | Barraza et al. | 341/176 |
| 6,091,515 A * | 7/2000 | Kimura | 358/434 |
| 6,101,608 A * | 8/2000 | Schmidt et al. | 726/2 |
| 6,268,925 B1 | 7/2001 | Yamanaka | 358/1.14 |
| 6,943,667 B1 | 9/2005 | Kammer et al. | 340/286.01 |
| 7,027,750 B2 | 4/2006 | Cho et al. | 399/70 |
| 7,120,372 B2 | 10/2006 | Kim et al. | 399/70 |
| 7,209,805 B2 | 4/2007 | Motoyama | 700/286 |
| 7,286,252 B2 | 10/2007 | Kawabuchi et al. | 358/1.15 |
| 2006/0010331 A1 | 1/2006 | Ohara | 713/323 |
| 2006/0029412 A1 | 2/2006 | Kato et al. | 399/80 |
| 2006/0112287 A1 | 5/2006 | Paljug | 713/300 |
| 2008/0170253 A1* | 7/2008 | Mohammad | 358/1.15 |
| 2009/0013055 A1* | 1/2009 | Hall et al. | 709/208 |

FOREIGN PATENT DOCUMENTS

JP 2000/218894 8/2000

* cited by examiner

Primary Examiner — Stefan Stoynov
(74) Attorney, Agent, or Firm — Scot A. Reader

(57) ABSTRACT

A remote wakeup capability for an imaging device, such as a multifunction printer (MFP) device. When the imaging device enters a power saving mode, a remote wakeup web service remains awake and initiates wakeup of the imaging device in response to a valid wakeup request received from a remote wakeup web service client module. Wakeup of the imaging device is thus achieved without a need for action on the imaging device front panel or a local client device connected to the imaging device via a serial or parallel port, and without wasting resources processing a superfluous imaging job.

12 Claims, 5 Drawing Sheets

REMOTE WAKEUP WEB SERVICE FOR IMAGING DEVICE

BACKGROUND OF THE INVENTION

The present invention relates to wakeup of a computing device from a power saving mode and, more particularly, to remote wakeup of an imaging device from a power saving mode.

As additional capabilities are added to computing devices, such as imaging devices, such devices consume more power. To make these devices more power efficient, manufacturers have equipped these devices with a power saving mode that the devices enter after a period of non-use. In the power saving mode, the supply of power is typically cut-off except to a few non-sleeping components of the device, such as components that are invoked to awaken the sleeping components of the device.

The methods by which known imaging devices can be awakened from power saving modes are limited. Some imaging devices can only be awakened by front panel action. In these devices, a user must walk to the imaging device and press a button on the imaging device to return the imaging device to a fully operational mode. Other imaging devices can additionally be awakened by sending an imaging job to the imaging device. While these imaging devices eliminate the requirement of front panel action, they typically require action from a local client device that is coupled to the imaging device via a serial or parallel port. Moreover, these imaging devices require the user to send an imaging job even if the user wants access to the imaging device for a reason other than imaging, such as device configuration, device cloning, statistics gathering, etc. In these situations, imaging device resources are consumed processing a superfluous imaging job. Additionally, the imaging device generally does not notify the local client device as to status regarding the return to the fully operational mode.

SUMMARY OF THE INVENTION

The present invention, in a basic feature, provides a remote wakeup capability for an imaging device, such as a multifunction printer (MFP) device. When the imaging device enters a power saving mode, a remote wakeup web service on the imaging device remains awake and initiates wakeup of the imaging device in response to a valid wakeup request received from a remote wakeup web service client module. Wakeup of the imaging device is thereby achieved without a need for action on the imaging device front panel or a local client device connected to the imaging device via a serial or parallel port, and without wasting resources processing a superfluous imaging job.

In one aspect of the invention, an imaging device comprises a network interface and a processor communicatively coupled with the network interface, wherein under control of the processor the imaging device enters a power saving mode and while in the power saving mode receives on the network interface a wakeup request, and wherein in response to the wakeup request and under control of the processor a remote wakeup web service on the imaging device selectively initiates wakeup of the imaging device from the power saving mode based on a determination of whether the wakeup request is serviceable.

In some embodiments, the wakeup request is a SOAP message over Hypertext Transport Protocol Secure (HTTPS) wakeup request. SOAP formerly stood for "Simple Object Access Protocol" but the acronym has been dropped.

In some embodiments, wakeup is initiated upon determining that the wakeup request is serviceable.

In some embodiments, wakeup is inhibited upon determining that the wakeup request is unserviceable.

In some embodiments, wakeup comprises transitioning the imaging device from the power saving mode to a fully operational mode.

In some embodiments, the determination of whether the wakeup request is serviceable comprises determining whether remote wakeup is enabled on the imaging device and authenticating a user credential carried in the wakeup request.

In some embodiments, under control of the processor the web service transmits via the network interface a first wakeup response indicating wakeup request status.

In some embodiments, the first wakeup response is a SOAP message over HTTPS wakeup response.

In some embodiments, under control of the processor the imaging device transmits via the network interface a second wakeup response indicating an updated wakeup request status.

In some embodiments, the second wakeup response conforms to an event notification type specified in the wakeup request.

In another aspect of the invention, a management device comprises a network interface and a processor communicatively coupled with the network interface, wherein under control of the processor a remote wakeup web service client module on the management device transmits via the network interface a wakeup request, and wherein in response to the wakeup request the client module receives via the network interface a first wakeup response and determines from the first wakeup response whether the wakeup request is serviceable.

In some embodiments, the wakeup request is a SOAP message over HTTPS wakeup request and the first wakeup response is a SOAP message over HTTPS wakeup response.

In some embodiments, the wakeup request carries a user credential and an event notification type.

In some embodiments, the client module starts a wakeup response timer upon transmitting the wakeup request and stops the wakeup response timer upon receiving the first wakeup response.

In some embodiments, the first wakeup response indicates status of the wakeup request.

In some embodiments, the management device further comprises a user interface communicatively coupled with the processor and under control of the processor the management device outputs on the user interface a status message based on the first wakeup response.

In some embodiments, the management device receives via the network interface a second wakeup response conforming to an event notification type carried in the wakeup request and indicating an updated wakeup request status.

In some embodiments, the management device further comprises a user interface and under control of the processor the management device outputs on the user interface a status message based on the second wakeup response.

In another aspect of the invention, a method for remote wakeup of an imaging device comprises the steps of entering a power saving mode by the imaging device, and while in the power saving mode, receiving a wakeup request and selectively initiating by a remote wakeup web service on the imaging device wakeup of the imaging device from the power saving mode based on a determination of whether the wakeup request is serviceable.

In some embodiment, the determination of whether the wakeup request is serviceable comprises the steps of determining whether remote wakeup is enabled on the imaging device and authenticating a user credential carried in the wakeup request.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
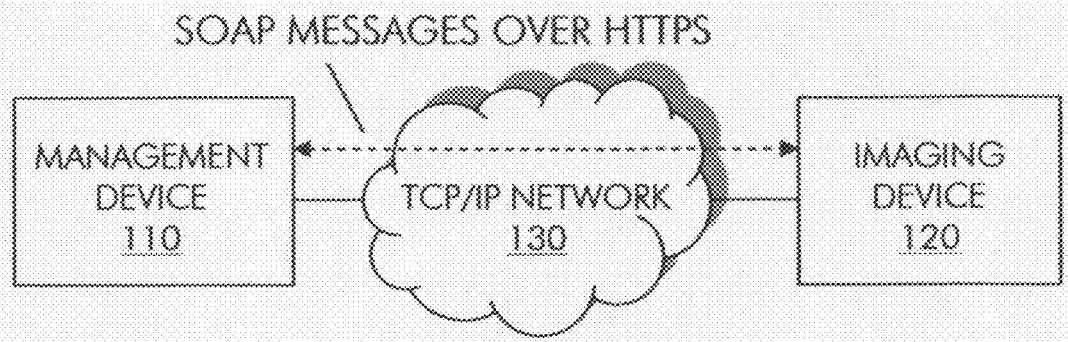
FIG. 1 shows a communication system in which the invention is operative in some embodiments.

FIG. 1 shows a communication system in which the invention is operative in some embodiments. The system includes a management device 110 communicatively coupled with an imaging device 120 over a Transport Control Protocol over Internet Protocol (TCP/IP) network 130. In accordance with the principles of the invention, when imaging device 120 is in a power saving mode, management device 110 attempts remote wakeup of imaging device 120 by transmitting a remote wakeup request to a remote wakeup web service hosted on imaging device 120. Such a remote wakeup request and any initial remote wakeup response transmitted by imaging device 120 are in some embodiments formatted as SOAP messages over HTTPS. TCP/IP network 130 may include any number of routers, switches and/or bridges that communicatively couple management node 110 and imaging device 120. In some embodiments, TCP/IP network 130 traverses the public Internet.

Figure 2:
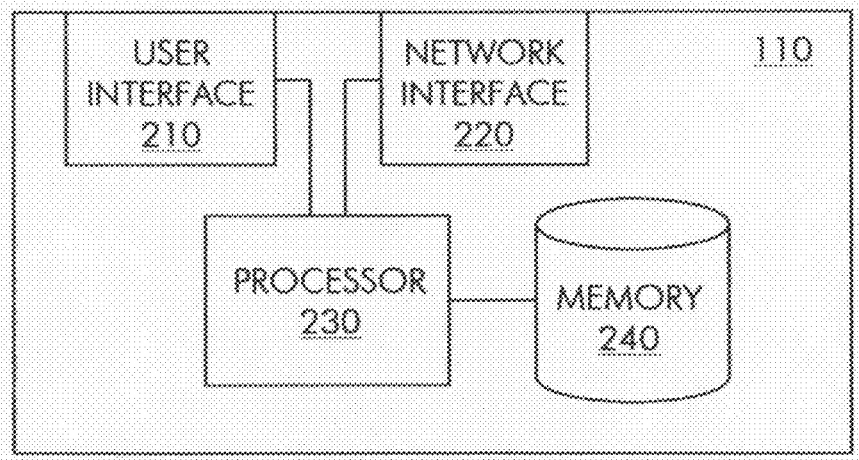
FIG. 2 shows the management device of FIG. 1 in more detail.

FIG. 2 shows management device 110 in greater detail. Management device 110 includes a user interface 210, a network interface 220 and a memory 240, all of which are communicatively coupled with a processor 230. User interface 210 has an input mechanism, such as a keyboard, keypad or touch-sensitive navigation tool for accepting inputs from a user and an output mechanism, such as a liquid crystal display (LCD) or cathode ray tube (CRT) for displaying outputs to a user. Network interface 220 is a wired or wireless local area network (LAN) interface, such as an IEEE 802.3- or 802.11-compliant interface, that communicatively couples server device 110 to TCP/IP network 130. Memory 240 includes one or more random access memories (RAM) and one or more read only memories (ROM). Processor 230 executes software installed in memory 240 to carry-out operations on management device 110 including, creating, scheduling and performing various tasks, among them generating and transmitting wakeup requests in response to inputs on user interface 210, processing wakeup responses received on network interface 220, and outputting wakeup status messages on user interface 210.

Figure 3:
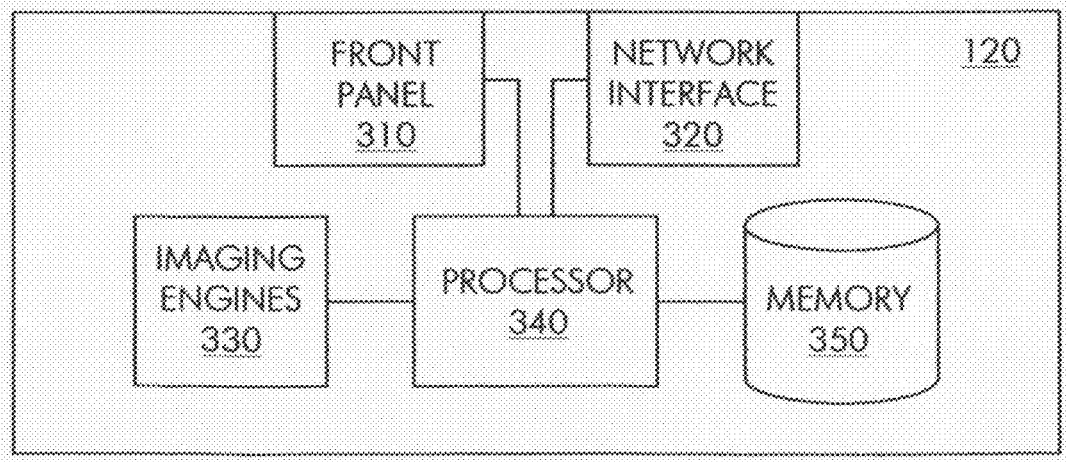
FIG. 3 shows the imaging device of FIG. 1 in more detail.

In FIG. 3, imaging device 120 is shown in more detail. Imaging device 120 is in some embodiments an MFP device that supports multiple imaging functions, such as printing, scanning and copying. Imaging device 120 has a front panel 310 for accepting inputs from walk-up users and displaying outputs to walk-up users. Imaging device 120 also has a network interface 320. Network interface 320 is a wired or wireless LAN interface, such as an Institute of Electrical and Electronics Engineers (IEEE) 802.3- or 802.11-compliant interface, that communicatively couples imaging device 120 to TCP/IP network 130. Internal to imaging device 120, interfaces 310, 320 are communicatively coupled with a processor 340, which is also coupled with a memory 350 and imaging engines 330. Imaging engines 330 include, for example, a scan/copy engine having scanner/copier logic, such as one or more integrated circuits (ICs), and an electromechanical section for performing a scanning and copying functions. The electromechanical section may have, for example, a line image sensor mounted on a movable carriage for optically scanning a document under the control of a scanner IC and storing the scanned document into memory 350. Imaging engines 330 also include, for example, a print engine having printer logic, such as one or more ICs, and an electromechanical section for performing printing functions. The electromechanical section may have, for example, a color ink jet head mounted on a movable carriage for printing a document under the control of a printer IC. While in the illustrated embodiment an imaging device that supports scanning, copying and printing is shown, in other embodiments of the invention an imaging device that supports additional or different imaging-related functions, such as faxing and filing, or a single-function imaging device, may be employed. Memory 350 includes one or more RAM and one or more ROM. Processor 340 executes software installed in memory 350 to carry-out operations on imaging device 120 including, creating, scheduling and performing various tasks, among them processing wakeup requests received on network interface 320, selectively initiating wakeup of imaging device 120 in response to wakeup requests, and generating and transmitting wakeup responses on network interface 320 in response to wakeup requests.

Figure 4:
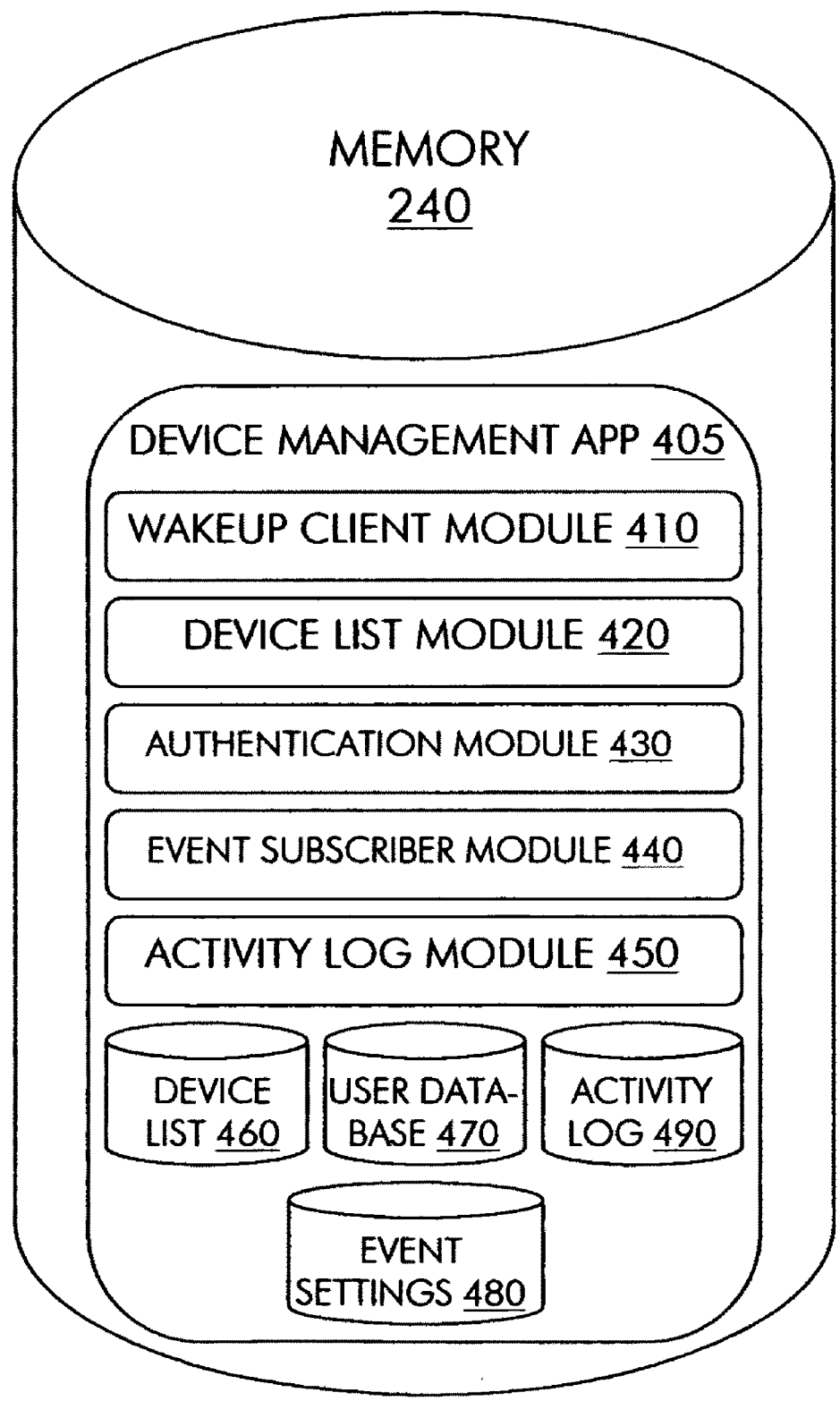
FIG. 4 shows functional elements of the management device of FIG. 1.

FIG. 4 shows functional elements of management device 110 to include an imaging device management application 405. Application 405 is a software program stored in memory 240 and executable by processor 230 to remotely manage imaging device 120. A user of management device 110 launches and interacts with application 405 through inputs on user interface 210.

Application 405 includes several elements that perform functions relating to remote wakeup of imaging device 120. A remote wakeup client module 410 is invoked by application 405 after a user through inputs on user interface 210 requests application 405 to perform a management action on imaging device 120 (e.g. device configuration, device cloning, statistics reporting, etc.) and application 405 discovers that imaging device 120 is in a power saving mode. In that event, client module 410 generates and transmits to imaging device 120 via network interface 220 a SOAP message over HTTPS-formatted wakeup request having information collected from a device list module 420, an authentication module 420 and an event subscriber module 440, which retrieve the information from a device list 460, a user database 470 and event settings 480, respectively. Client module 410 also receives from imaging device 120 via network interface 220 and processes wakeup responses to the wakeup request. Client module 410 also causes status messages based on wakeup responses to be displayed on user interface 210. Client module 410 also sets and monitors a wakeup response timer after transmitting the wakeup request and aborts the remote wakeup attempt if the timer expires prior to receiving a wakeup response from imaging device 120, in which case client module 410 causes a status messages indicating that the remote wakeup attempt has been aborted to be displayed on user interface 210. In some embodiments, client module 410, after aborting a remote wakeup attempt, reattempts remote wakeup until a predetermined number of unsuccessful attempts have been made. Client module 410 also causes times and results of wakeup requests to be logged in activity log 490 through calls to activity log module 450.

Device list module 420 is called by client module 410 for the Uniform Resource Identifier (URI) of imaging device 120. Device list module 420 retrieves the URI from device list 470 and returns the URI to client module 410.

Authentication module 430 is called by client module 410 for user credentials associated with a user of management device 110 that are used by imaging device 120 to verify that the user is authorized to remotely wakeup imaging device 120. Authentication module 430 retrieves the user credentials from user database 470 and returns the user credentials to client module 410. The user credentials may include, for example, a username and password, or a user certificate. Although user database 470 is shown internal to management device 110, in some embodiments user database 470 may be maintained externally and accessed using Windows security, active directory, Lightweight Directory Access Protocol (LDAP) or other service.

Event subscriber module 440 is called by client module 410 for an event notification type for reporting events occurring in connection with wakeup. Event subscriber module 440 retrieves the type from event settings 480 and returns the type to client module 410. The type may specify reporting of SNMP trap events or SOAP events, for example. The event notification type is configurable by the user of management device 110 through inputs on user interface 210.

Activity log module 450 is called by client module 410 to log in activity log 490 remote wakeup activities, such as times and results of wakeup attempts.

Figure 5:
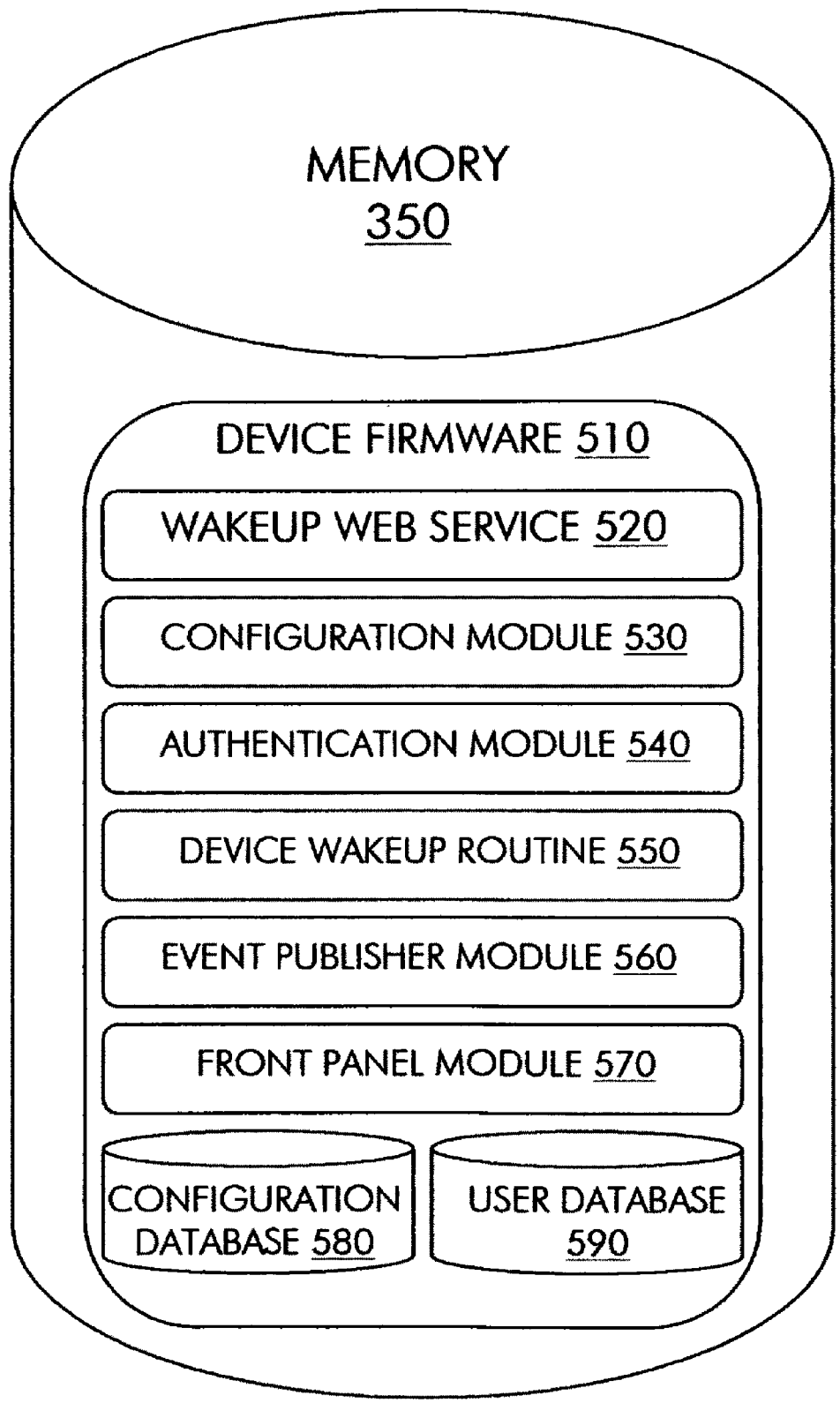
FIG. 5 shows functional elements of the imaging device of FIG. 1.

FIG. 5 shows functional elements of imaging device 120 to include device firmware 510. Firmware 510 is embedded software stored in memory 350 and executable by processor 340 to operate and manage imaging device 120.

Firmware 510 has several elements that perform functions relating to remote wakeup of imaging device 120. A remote wakeup web service 520 is a web service exposed by imaging device 120 that remains awake while imaging device 120 is in a power saving mode and is invoked in response to receipt via network interface 320 of a wakeup request sourced from management device 110. Web service 520 processes the wakeup request and makes an initial determination of whether the wakeup request is serviceable. Web service 520 collects information from a configuration module 530 and an authentication module 540, which access information from a configuration database 580 and a user database 590, respectively, to facilitate the initial determination of whether the wakeup request is serviceable. Upon making an initial determination that the wakeup request is serviceable, web service 520 calls device wakeup routine 550 to initiate wakeup of imaging device 120. Web service 520 also generates and transmits to management device 110 via network interface 320 an initial wakeup response that indicates whether the wakeup request is serviceable based on the initial determination. In some embodiments, the wakeup request and the initial wakeup response are SOAP message over HTTPS formatted. Web service 520 also provides to an event publisher module 560 an event notification type specified in the wakeup request for reporting events that occur in connection with wakeup.

Configuration module 530 is called by web service 520 to verify that remote wakeup is presently enabled on imaging device 120. Configuration module 530 checks a remote wakeup setting in configuration database 580 to determine whether remote wakeup is presently enabled or disabled. If the setting indicates that remote wakeup is enabled, configuration module 530 reports that finding to web service 520. If the setting indicates that remote wakeup is disabled, configuration module 530 reports that finding to web service 520. The remote wakeup setting may be configured through inputs made by a human user on front panel 310. When such inputs are received, front panel module 570 calls configuration module 530, which saves the remote wakeup setting in configuration database 580. Configuration database 580 may be a relational database or a file saved on a hard disk, for example.

Authentication module 540 is called by web service 520 to verify that the user requesting remote wakeup of imaging device 120 is authorized for that purpose. Authentication module 540 compares for a match a user credential carried in the wakeup request with user credentials stored in user database 590. The compared user credentials may include, for example, a username and password or a user certificate. If a match is found, authentication module 540 reports a successful authentication to web service 520. If no match is found, authentication module 540 reports an authentication failure to web service 520.

Device wakeup routine 550 initiates wakeup of imaging device 120 when called by web service 520. Wakeup of imaging device 120 includes, for example, powering-up sleeping electromechanical components of imaging device 120, such as imaging engines 330, to bring imaging device 120 to a fully operational mode.

Event publisher module 560 is informed by web service 520 of the event notification type specified in the wakeup request for reporting events occurring in connection with wakeup. The type may specify Simple Network Management Protocol (SNMP) or SOAP event reporting, for example. Event publisher module 560 monitors for events of the specified type and generates and transmits to management device 110 via network interface 320 supplemental wakeup responses having an updated wakeup request status indicative of serviceability of the wakeup request based on such events. Supplemental wakeup responses are formatted in conformance with the specified event notification type. For example, if the specified type is SOAP event reporting, supplemental wakeup responses may be formatted as SOAP messages. If the specified type is SNMP event reporting, supplemental wakeup responses may be formatted as SNMP trap messages.

Figure 6:
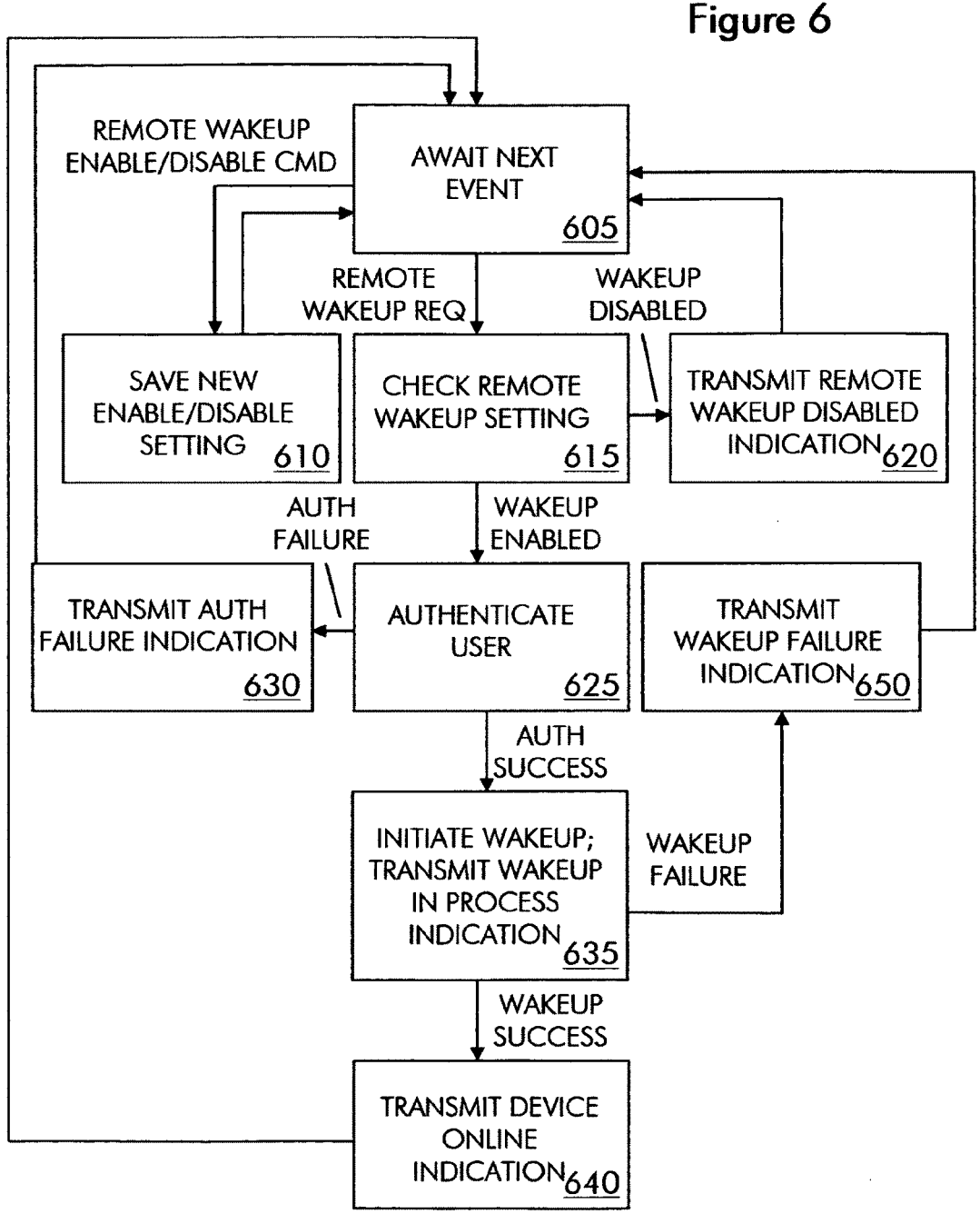
FIG. 6 shows a method performed by the imaging device of FIG. 1 in some embodiments of the invention.

FIG. 6 shows a method performed by imaging device 120 in some embodiments of the invention. After a predetermined time of inactivity, imaging device 120 enters a power saving mode and listens for an event (605). If the next event is a remote wakeup enable or disable command input on front panel 310, configuration module 530 saves the new enable or disable setting in configuration database 590 (610) and imaging device 120 awaits the next event (605). If the next event is a wakeup request received from management node 110 on network interface 320, remote wakeup web service 520 calls configuration module 530 to verify that remote wakeup is presently enabled (615). If configuration module 530 determines that remote wakeup is presently disabled, configuration module 530 reports disabled status to web service 520 and web service 520 transmits to management node 110 a wakeup response indicating that remote wakeup is disabled (620) and imaging device 120 awaits the next event (605). If, however, configuration module 530 determines that remote wakeup is presently enabled, configuration module 530 reports enabled status to web service 520 and web service 520 calls authentication module 540 to verify user credentials carried in the wakeup request (625). If authentication module 540 is unable to verify the user credentials, authentication module 540 reports an authentication failure to web service 520 and web service 520 transmits to management node 110 a wakeup response indicating an authentication failure (630) and imaging device 120 awaits the next event (605). If, on the other hand, authentication module 540 is able to verify the user credentials, authentication module 540 reports authentication success to web service 520 and web service 520 calls device wakeup routine 550 to initiate wakeup of imaging device 120 and transmits to management node 110 an initial wakeup response indicating that remote wakeup is in process (635). Web service 520 also informs event publisher module 560 of the event notification type specified in the wakeup request and event publisher module 560 monitors for such events. The wakeup process proceeds and eventually either fails, in which case event publisher module 560 transmits to management node 110 a supplemental wakeup response formatted in conformance with the event notification type indicating a wakeup failure (650) and imaging device 120 awaits the next event (605), or succeeds, in which case event publisher module 560 transmits to management node 110 a supplemental wakeup response formatted in conformance with the event notification type indicating that imaging device 120 is online (640).

Figure 7:
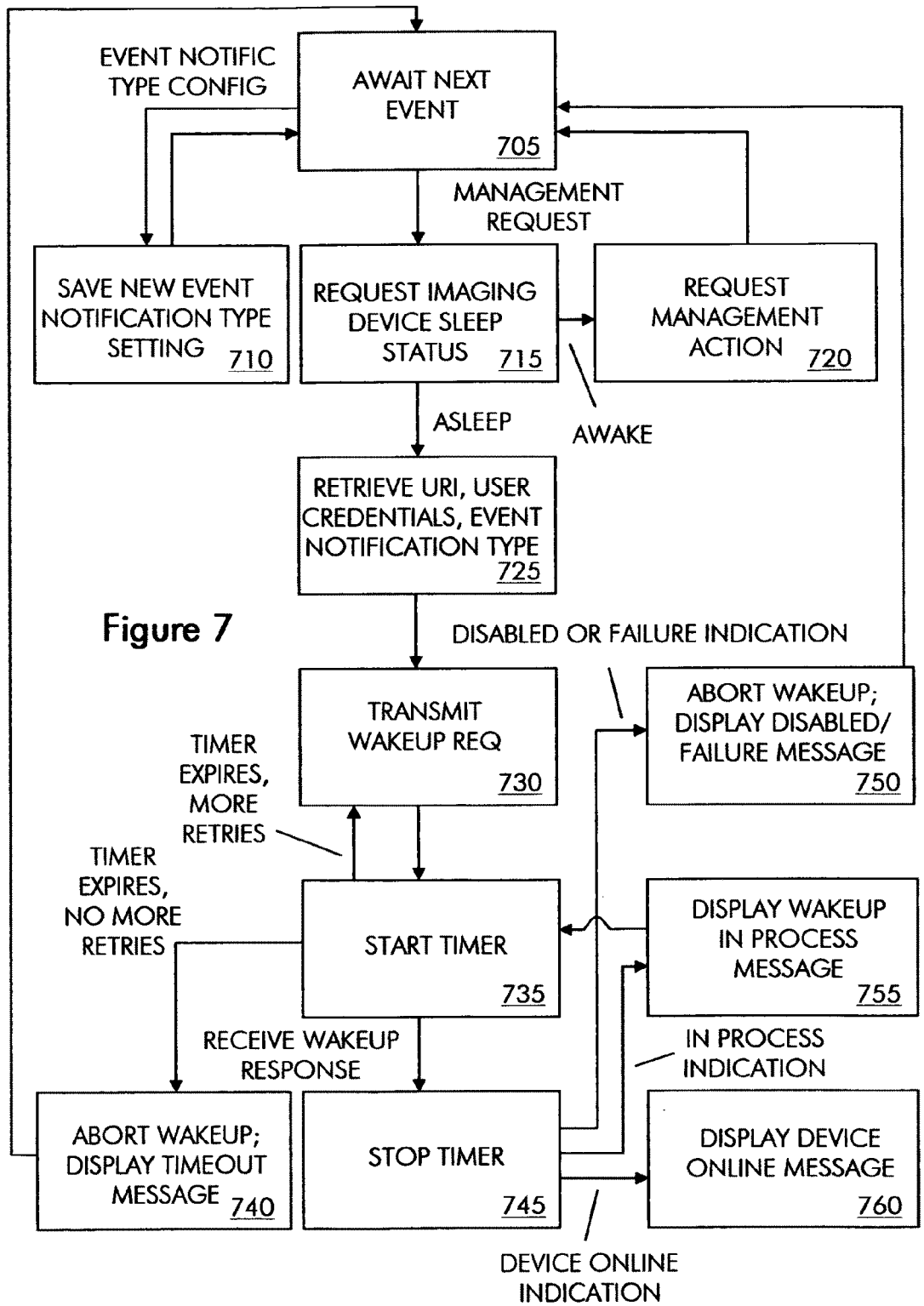
FIG. 7 shows a method performed by the management device of FIG. 1 in some embodiments of the invention.

FIG. 7 shows a method performed by management device 110 in some embodiments of the invention. The flow begins with management device 110 awaiting the next event (705). If the next event is an event notification type configuration command input on user interface 210, event subscriber module 440 saves the new event notification type in event settings 480 (710) and management device 110 awaits the next event (705). If the next event is an imaging device management request (e.g. device configuration request, device cloning request, statistics reporting request, etc.) received on user interface 210, device management application 405 discovers the sleep status of imaging device 120 (715). In some embodiments, application 405 transmits to imaging device 120 via network interface 220 a sleep status request in conformance with the event notification type in event settings 480 and requesting whether imaging node 120 is in a fully operational mode or a power saving mode and receives from imaging device 120 a status response in conformance with the event notification type indicating the current mode. In any event, if imaging device 120 is discovered to be in a fully operational mode (i.e. awake), application 405 next requests imaging device 120 to perform the indicated management action (720) and management device 110 awaits the next event (705). If, however, imaging device 120 is discovered to be in a power saving mode (i.e. asleep), remote wakeup client module 410 calls device list module 420 for a URI of imaging device 120, calls authentication module 430 for user credentials, calls event subscriber module 440 for an event notification type (725) and generates a wakeup request addressed to the URI and carrying the user credentials and event notification type. Client module 410 transmits the wakeup request to imaging node 120 via network interface 220 (730) and starts a wakeup response timer (735). Eventually, either a wakeup response is received or the wakeup response timer expires. If the timer expires, client module 410 aborts the wakeup attempt (after exhausting the configured number of retries) and causes to be displayed on user interface 210 a status message indicating that the remote wakeup attempt has failed (740) and management device 110 awaits the next event (705). If, on the other hand, a wakeup response is received before the timer expires, client module 410 stops the timer (745) and analyzes the wakeup response. If the wakeup response indicates that remote wakeup is disabled or has failed (e.g. authentication failure, error condition, etc.), client module 410 aborts the wakeup attempt and causes to be displayed on user interface 210 a status message indicating that the remote wakeup attempt has failed and the reason (750) and management device 110 awaits the next event (705). If, on the other hand, the wakeup response indicates that remote wakeup is in process, client module 410 causes to be displayed on user interface 210 a status message indicating that the remote wakeup is in process (755) and starts a wakeup response timer (735). If the wakeup response indicates that remote wakeup is complete, client module 410 causes to be displayed on user interface 210 a status message indicating that the remote wakeup is complete (760).

It will be appreciated by those of ordinary skill in the art that the invention can be embodied in other specific forms without departing from the spirit or essential character hereof. For example, while SOAP message over HTTPS wakeup requests and wakeup responses have been described, other communication protocols may be used. The present description is therefore considered in all respects to be illustrative and not restrictive. The scope of the invention is indicated by the appended claims, and all changes that come with in the meaning and range of equivalents thereof are intended to be embraced therein.

What is claimed is:

1. An imaging device, comprising:
a network interface; and
a processor communicatively coupled with the network interface, wherein under control of the processor the imaging device enters a power saving mode and while in the power saving mode receives on the network interface a status request, wherein in response to the status request the imaging device without initiating wakeup of the imaging device from the power saving mode transmits on the network interface a status response indicating that the imaging device is in the power saving mode, wherein while in the power saving mode the imaging device further receives on the network interface a wakeup request, and wherein in response to the wakeup request and under control of the processor a remote wakeup web service on the imaging device selectively initiates wakeup of the imaging device from the power saving mode based on a determination of whether the wakeup request is serviceable.

2. The imaging device of claim 1, wherein the wakeup request is a SOAP message over Hypertext Transport Protocol Secure (HTTPS) wakeup request.

3. The imaging device of claim 1, wherein wakeup is initiated upon determining that the wakeup request is serviceable.

4. The imaging device of claim 1, wherein wakeup is inhibited upon determining that the wakeup request is unserviceable.

5. The imaging device of claim 1, wherein wakeup comprises transitioning the imaging device from the power saving mode to a fully operational mode.

6. The imaging device of claim 1, wherein the determination of whether the wakeup request is serviceable comprises determining whether remote wakeup is enabled on the imaging device and authenticating a user credential carried in the wakeup request.

7. The imaging device of claim 1, wherein under control of the processor the web service transmits via the network interface a first wakeup response indicating wakeup request status.

8. The imaging device of claim 7, wherein the first wakeup response is a SOAP message over HTTPS wakeup response.

9. The imaging device of claim 7, wherein under control of the processor the imaging device transmits via the network interface a second wakeup response indicating an updated wakeup request status.

10. The imaging device of claim 9, wherein the second wakeup response conforms to an event notification type specified in the wakeup request.

11. A method for remote wakeup of an imaging device, comprising the steps of:
   entering a power saving mode by the imaging device; and while in the power saving mode,
   receiving a status request on the imaging device;
   transmitting a status response by the imaging device indicating that the imaging device is in the power saving mode, without initiating wakeup of the imaging device from the power saving mode;
   receiving a wakeup request on the imaging device; and
   selectively initiating by a remote wakeup web service on the imaging device wakeup of the imaging device from the power saving mode based on a determination of whether the wakeup request is serviceable.

12. The method of claim 11, wherein the determination of whether the wakeup request is serviceable comprises the steps of:
   determining whether remote wakeup is enabled on the imaging device; and
   authenticating a user credential carried in the wakeup request.

* * * * *